(12) United States Patent
Bommarito

(10) Patent No.: US 7,278,212 B2
(45) Date of Patent: Oct. 9, 2007

(54) UNIVERSAL JOINT WITH ADHESIVE BEARING CUP RETENTION METHOD

(75) Inventor: Michael J. Bommarito, Portage, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 286 days.

(21) Appl. No.: 10/959,765

(22) Filed: Oct. 6, 2004

(65) Prior Publication Data

US 2006/0073901 A1    Apr. 6, 2006

(51) Int. Cl.
*B23P 17/00* (2006.01)

(52) U.S. Cl. .................... 29/898.11; 29/458; 29/527.1; 29/530; 156/293; 156/330

(58) Field of Classification Search ............ 29/898.01, 29/898.04, 898.11, 898.12, 458, 460, 525.01, 29/527.1, 530; 156/293, 305, 330; 464/128, 464/130
See application file for complete search history.

(56) References Cited

U.S. PATENT DOCUMENTS

| | | | |
|---|---|---|---|
| 3,218,692 A * | 11/1965 | Kayser .................... 29/898.11 |
| 3,492,710 A | 2/1970 | Pitner | |
| 3,545,232 A | 12/1970 | Neese | |
| 3,701,189 A | 10/1972 | Kadono et al. | |
| 4,073,162 A | 2/1978 | DeBisschop | |
| 5,647,799 A * | 7/1997 | Gall et al. ................... 464/128 |
| 5,836,078 A * | 11/1998 | Aiken et al. ............. 29/898.07 |
| 6,805,635 B1 * | 10/2004 | Organ ......................... 464/130 |
| 2004/0224778 A1* | 11/2004 | Menosky et al. ........... 464/136 |
| 2004/0224779 A1* | 11/2004 | Menosky ..................... 464/178 |

* cited by examiner

*Primary Examiner*—Jermie E. Cozart
(74) *Attorney, Agent, or Firm*—Harness, Dickey & Pierce, P.L.C.

(57) ABSTRACT

A universal joint including a spider having a plurality of trunnions. The universal joint also includes a pair of yokes, where each yoke has a pair of arms with an aperture formed therethrough, and each yoke is arranged such that an opposite pair of the trunnions are received into the apertures in the arms. The universal joint additionally includes a plurality of bearing cups. Each bearing cup has at least one recess formed into its outer surface and is received in an associated one of the trunnions and a corresponding aperture in an associated one of the arms. A plurality of retaining members are also included. Each of the retaining members are formed of an epoxy that is disposed in the at least one recess, where each of the retaining members couples an associated one of the bearing cups in its associated arm.

15 Claims, 4 Drawing Sheets

UNIVERSAL JOINT WITH ADHESIVE BEARING CUP RETENTION METHOD

FIELD OF THE INVENTION

The present invention generally relates to vehicle drivelines and more particularly to a method and apparatus for manufacturing a universal joint of the type that is commonly employed in vehicle drivelines.

BACKGROUND OF THE INVENTION

Propshafts are commonly employed for transmitting power from a rotational power source, such as the output shaft of a vehicle transmission, to a rotatably driven mechanism, such as a differential assembly. Generally, propshafts are connected to the rotational power source and rotatably driven mechanism via a constant velocity or universal joint. The universal joint is typically formed from two yokes, a spider that is disposed between the yokes, and a plurality of bearing cups that are received onto the trunnions of the spider.

The bearing cups may be attached to the yokes through molten plastic injection. The plastic injection process requires extensive tooling to create a finished product. In addition, due to the extensive tooling required to create the plastic injected bond between the bearing cups and the yokes, the plastic injection bond cannot be replicated when servicing the universal joint. Rather, a snap-ring is generally employed during servicing the universal joint to secure the bearing cups to yokes, resulting in a universal joint which is substantially distinct from the originally assembled universal joint. Accordingly, it is desirable to provide an improved universal joint which can be assembled after servicing in a manner that mimics its original factory assembly.

SUMMARY OF THE INVENTION

In one form, the present teachings provide a universal joint including a spider having a plurality of trunnions. The universal joint also includes a pair of yokes, where each yoke has a pair of arms with an aperture formed therethrough, and each yoke is arranged such that an opposite pair of the trunnions are received into the apertures in the arms. The universal joint additionally includes a plurality of bearing cups. Each bearing cup has at least one recess formed into its outer surface and is received in an associated one of the trunnions and a corresponding aperture in an associated one of the arms. A plurality of retaining members are also included. Each of the retaining members are formed of an epoxy that is disposed in the at least one recess, where each of the retaining members couples an associated one of the bearing cups in its associated arm.

In another form, the present teachings provide a method including providing a yoke with a pair of arms, with each of the arms having a trunnion aperture formed therein. Next, a trunnion is installed into each trunnion aperture. Then, the method provides for installing a bearing cup such that it is received into one of the trunnion apertures and received onto an associated trunnion prior to injecting an epoxy between the arms and the bearing cups. Lastly, the epoxy is cured to secure the bearing cups to the arms.

In one form, the present teachings provide a method for inserting a bearing cup into a trunnion aperture formed in an arm of a yoke and injecting an adhesive between the bearing cup and the arm of the yoke. Next, the method provides for curing the adhesive at a temperature that is less than about 130° F.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF VARIOUS EMBODIMENTS

The following description of various embodiments is merely exemplary in nature and is in no way intended to limit the invention, its application, or uses. Although the following description is related generally to a universal joint for a propshaft on a vehicle, it will be understood that the universal joint and related method, as described and claimed herein, can be used with any appropriate structure. Therefore, it will be understood that the following discussions is not intended to limit the scope of the appended claims.

Figure 1:
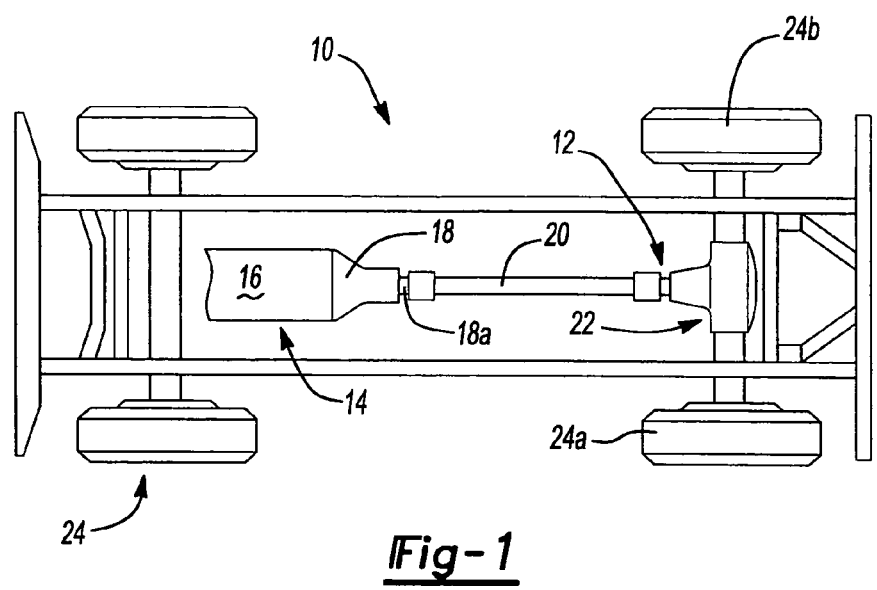
FIG. 1 is a schematic illustration of an exemplary vehicle with a propshaft constructed in accordance with the teachings of the present invention.

With reference to FIG. 1 of the drawings, a vehicle constructed in accordance with the teachings of the present invention is generally indicated by reference numeral 10. The vehicle 10 includes a driveline 12 drivable via a connection to a power train 14. The power train 14 includes an engine 16 and a transmission 18. The driveline 12 includes a propshaft assembly 20, a rear axle assembly 22 and a plurality of wheels 24. The engine 16 is mounted in an in-line or longitudinal orientation along the axis of the vehicle 10 and its output is selectively coupled via a conventional clutch to the input of the transmission 18 to transmit rotary power (i.e., drive torque) therebetween. The input of the transmission 18 is commonly aligned with the output of the engine 16 for rotation about a rotary axis. The transmission 18 also includes an output 18a and a gear reduction unit (not shown). The gear reduction unit is operable for coupling the transmission input to the output 18a of the transmission at a predetermined gear speed ratio. The propshaft assembly 20 is coupled for rotation with the output 18a of the transmission 18. Drive torque is transmitted through the propshaft assembly 20 to the rear axle assembly 22 where it is selectively apportioned in a predetermined manner to the left and right rear wheels 24a and 24b, respectively.

Figure 2:
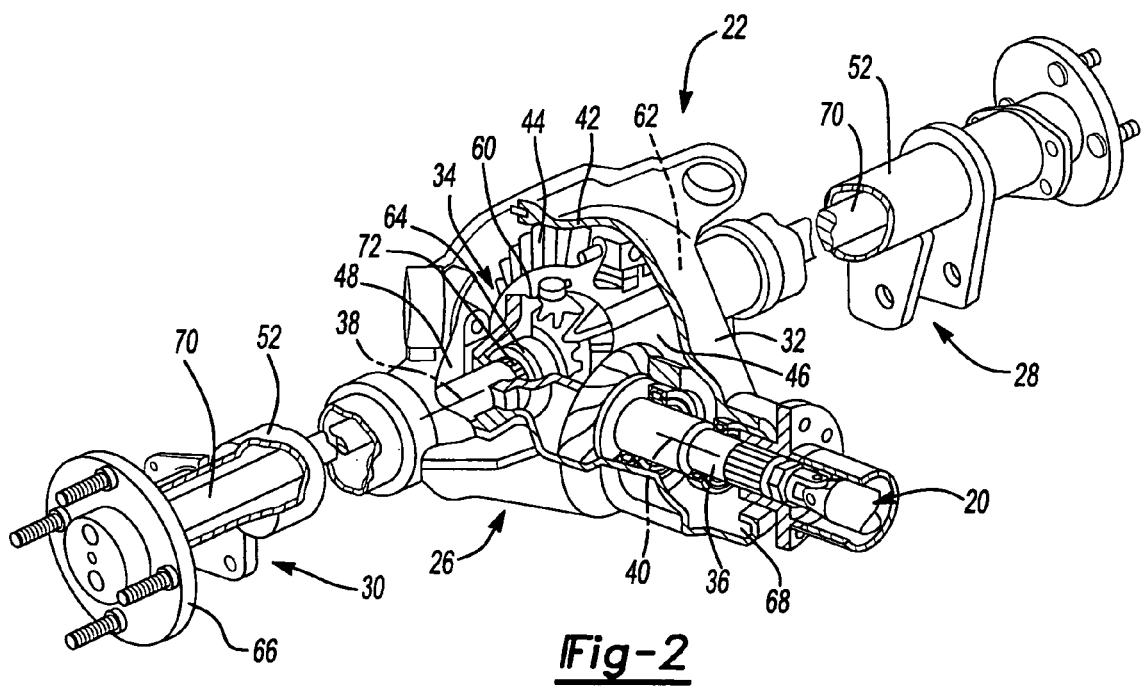
FIG. 2 is a top partially cut-away view of a portion of the vehicle of FIG. 1 illustrating the rear axle and the propshaft in greater detail.

With continuing reference to FIG. 1 and additional reference to FIG. 2, the rear axle assembly 22 is shown to include a differential assembly 26, a left axle shaft assembly 28 and a right axle shaft assembly 30. The differential assembly 26 includes a housing 32, a differential unit 34 and an input shaft assembly 36. The housing 32 supports the differential unit 34 for rotation about a first axis 38 and further supports the input shaft assembly 36 for rotation about a second axis 40 that is perpendicular to the first axis 38.

The housing 32 includes a wall member 42 that defines a central cavity 44 having a left axle aperture 46, a right axle aperture 48 and an input shaft aperture 68. The housing 32 may include a pair of axle tubes 52 that are fixedly mounted to the wall member 42. The differential unit 34 is disposed within the central cavity 44 of the housing 32 and includes a gearset 60. The gearset 60 includes first and second side gears 62 and 64, respectively, and a plurality of pinions (not shown). The left and right axle shaft assemblies 28 and 30 extend through the left and right axle apertures 46 and 48, respectively, where they are coupled for rotation about the first axis 38 with the first and second side gears 62 and 64, respectively. A flange 66, which may be employed to support a brake assembly (not shown), may be coupled to a distal end of both the left and right axle shaft assemblies 28 and 30.

The input shaft assembly 36 extends through the input shaft aperture 68 where it is supported in the housing 32 for rotation about the second axis 40. The input shaft assembly 36 is coupled for rotation with the propshaft assembly 20 and is operable for transmitting drive torque to the differential unit 34. More specifically, the drive torque received by the input shaft assembly 36 is transmitted to the differential unit 34 such that drive torque is distributed to the first and second side gears 62 and 64, causing the left and right axle shaft assemblies 28 and 30 to rotate about the first axis 38.

The left and right axle shaft assemblies 28 and 30 may include an axle shaft 70 that is supported for rotation in the axle tube 52 about the first axis 38. Each of the axle shafts 70 may include an externally splined portion 72 that may meshingly engage a mating internally splined portion (not specifically shown) that is formed into the first and second side gears 62 and 64, respectively.

Figure 3:
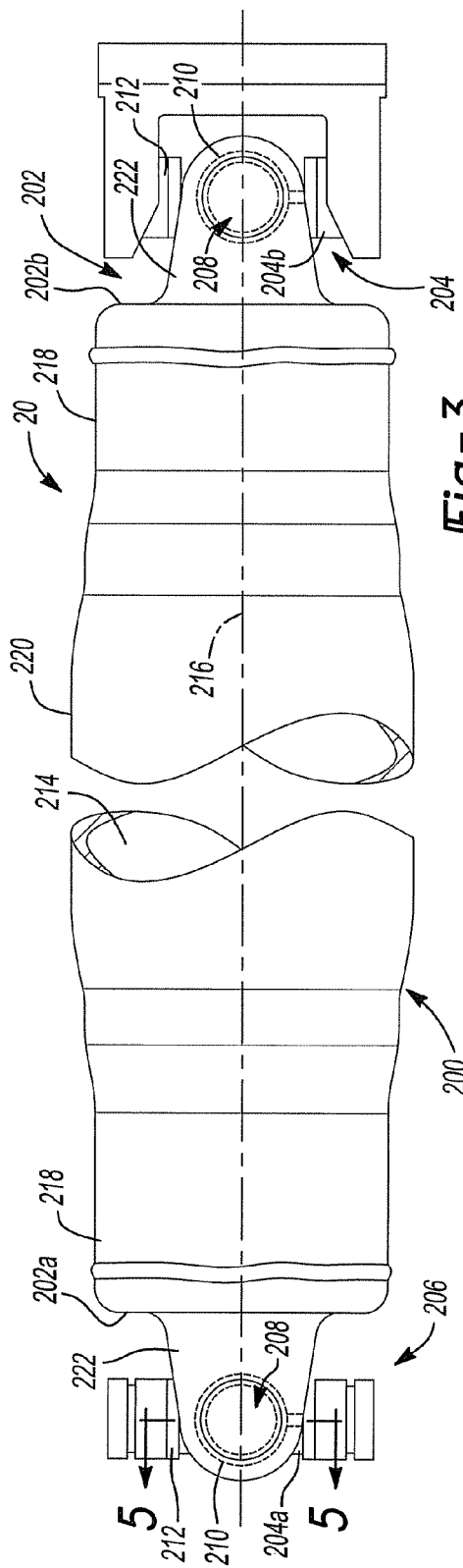
FIG. 3 is a top view of the propshaft of FIG. 1.

With reference to FIG. 3, the propshaft assembly 20 can have a shaft structure 200 and a universal joint that can include a trunnion cap 202, a spider 204, a yoke assembly 206, a plurality of bearing cups 208 and a plurality of retaining members 210. The spider 204, which includes a plurality of cylindrical projections or trunnions 212, is generally conventional in its construction and need not be discussed in detail herein.

The shaft structure 200 can be generally cylindrical and can have a hollow central cavity 214 and a longitudinal axis 216. The shaft structure 200 includes ends 218 which can be formed in a rotary swaging operation and can be necked down somewhat relative to the central portion 220 of the shaft structure 200. The shaft structure 200 can be formed from a welded seamless material, such as aluminum (e.g., 6061-T6 conforming to ASTM B-210) or steel.

The trunnion cap 202, which can be coupled to the end 218 of the shaft structure 200, and the yoke assembly 206, can include a pair of arms 222 that are generally symmetrically disposed about an axis A. Each arm 222 can have a first aperture 224, a second aperture 226 and a recess, such as an annular groove 228, that is formed about the second aperture 226. The second aperture 226 is formed generally transversely through the arm 222 and is sized to receive an associated one of the bearing cups 208. The first aperture 224 can be formed generally transverse to the second aperture 226 and can intersect the annular groove 228.

The bearing cups 208 can be generally container shaped and sized to be received into the second aperture 226 in an associated one of the arms 222. Each bearing cup 208 can have a bore 230 that can be sized to receive a plurality of bearing elements, such as rollers (not specifically shown), that are disposed about an associated one of the trunnions 212. A recess, such as an annular groove 232, may be formed in the outer surface of the bearing cups 208.

Figure 4:
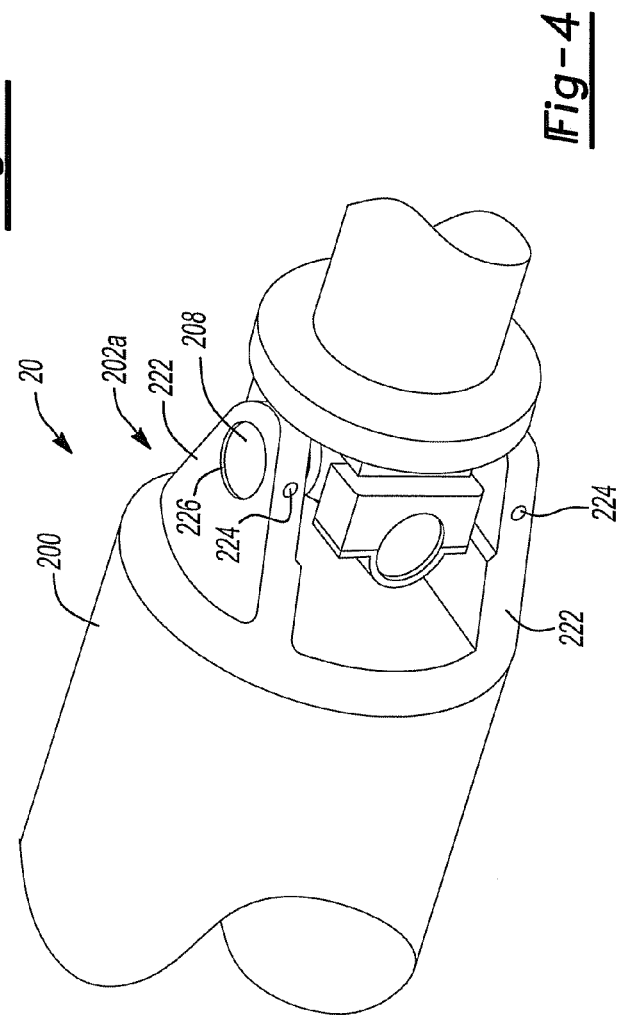
FIG. 4 is a detailed perspective view of the propshaft of FIG. 1.
Figure 5:
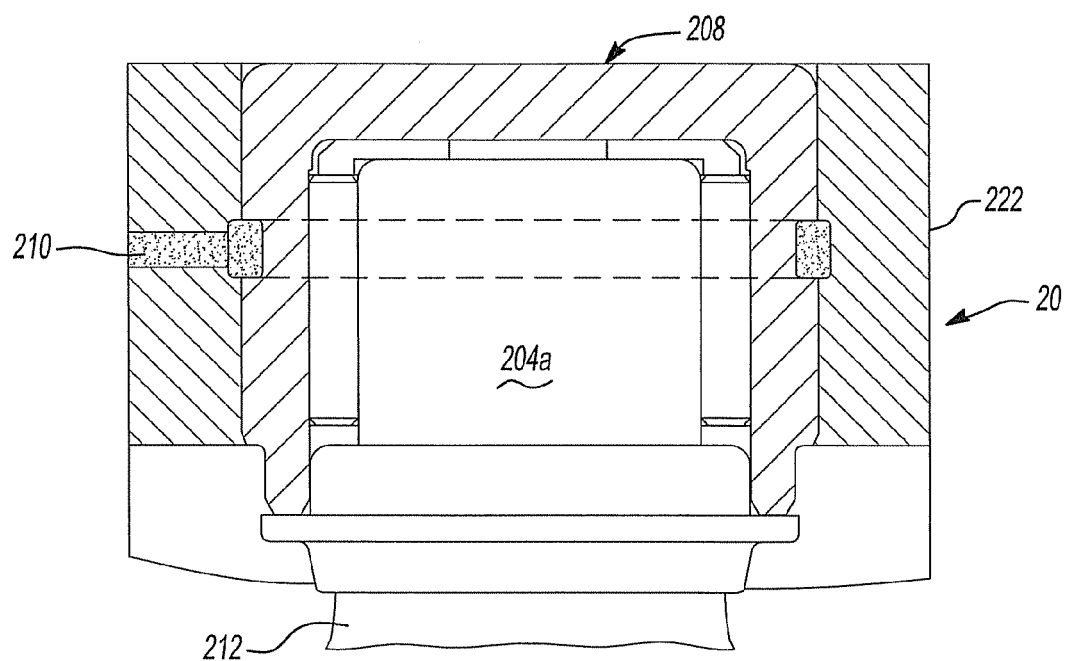
FIG. 5 is a cross-sectional view taken along the line 5-5 of FIG. 4.
Figure 6:
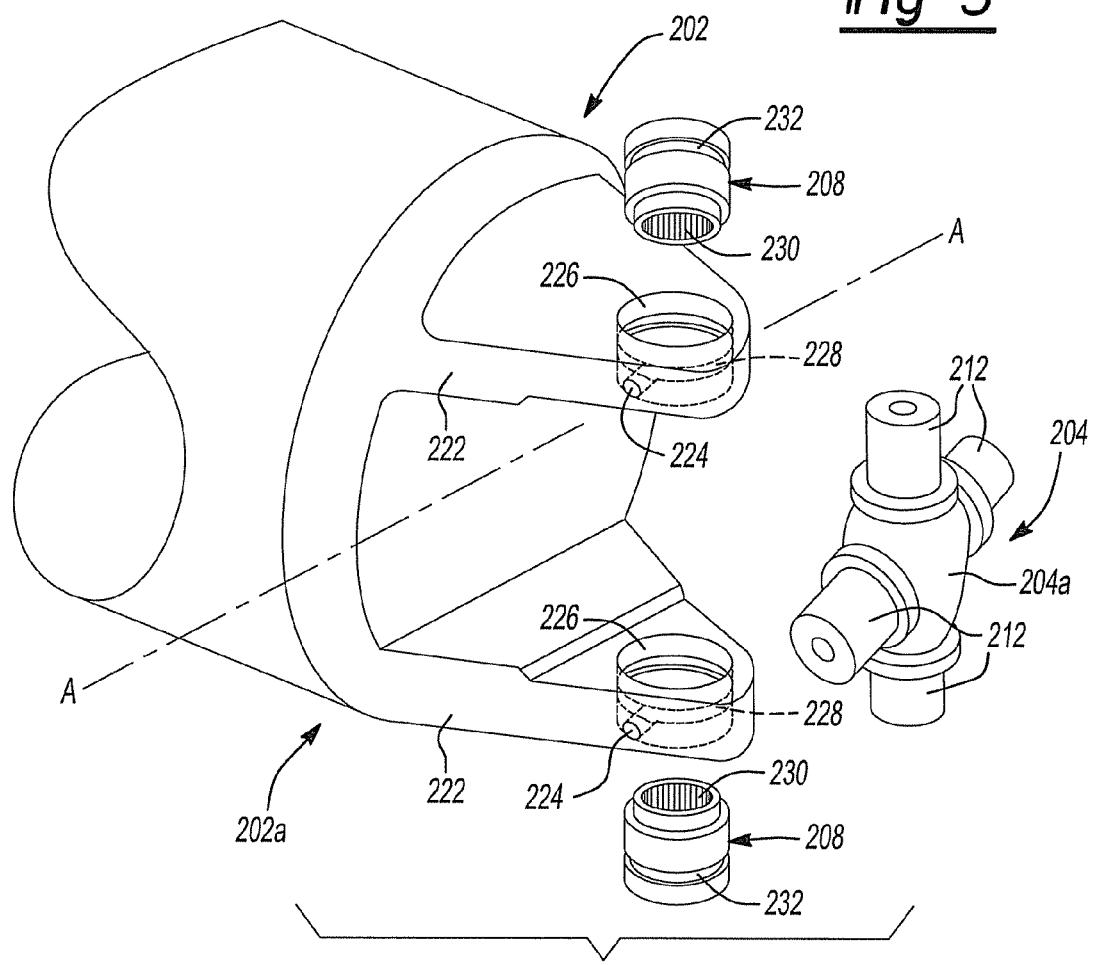
FIG. 6 is an exploded perspective view of the propshaft of FIG. 1.

With reference to FIGS. 4 through 6, the spider 204 is arranged relative to the trunnion cap 202 and yoke assembly 206 such that each of the trunnions 212 is disposed in one of the bearing cups 208 and the bearing cups 208 are received into the second apertures 226 in the arms 222. The retaining members 210 are employed to secure the bearing cups 208 to their respective arms 222. The retaining members 210 can be an adhesive or epoxy material that can be introduced between the arm 222 and the bearing cup 208 in a liquid or gel form in such a way as to at least partially fill the annular grooves 228, 232 to thereby lock the bearing cup 208 to the arm 222. The material that forms the retaining members 210 may cure at a relatively low temperature, such as at or below 130° F. and preferably between about 50° F. to about 100° F. (i.e., at "room temperature") to thereby eliminate the need to heat any portion of the universal joint to cure the retaining members 210. Examples of materials that can be used to form the retaining members 210 include any two-part epoxy yielding a minimum 2000 pound push-out force when retaining the universal joint, such as DEVCON® Inst-N-Epoxy, DEVCON® Plastic Steel, and JB WELD®.

Figure 7:
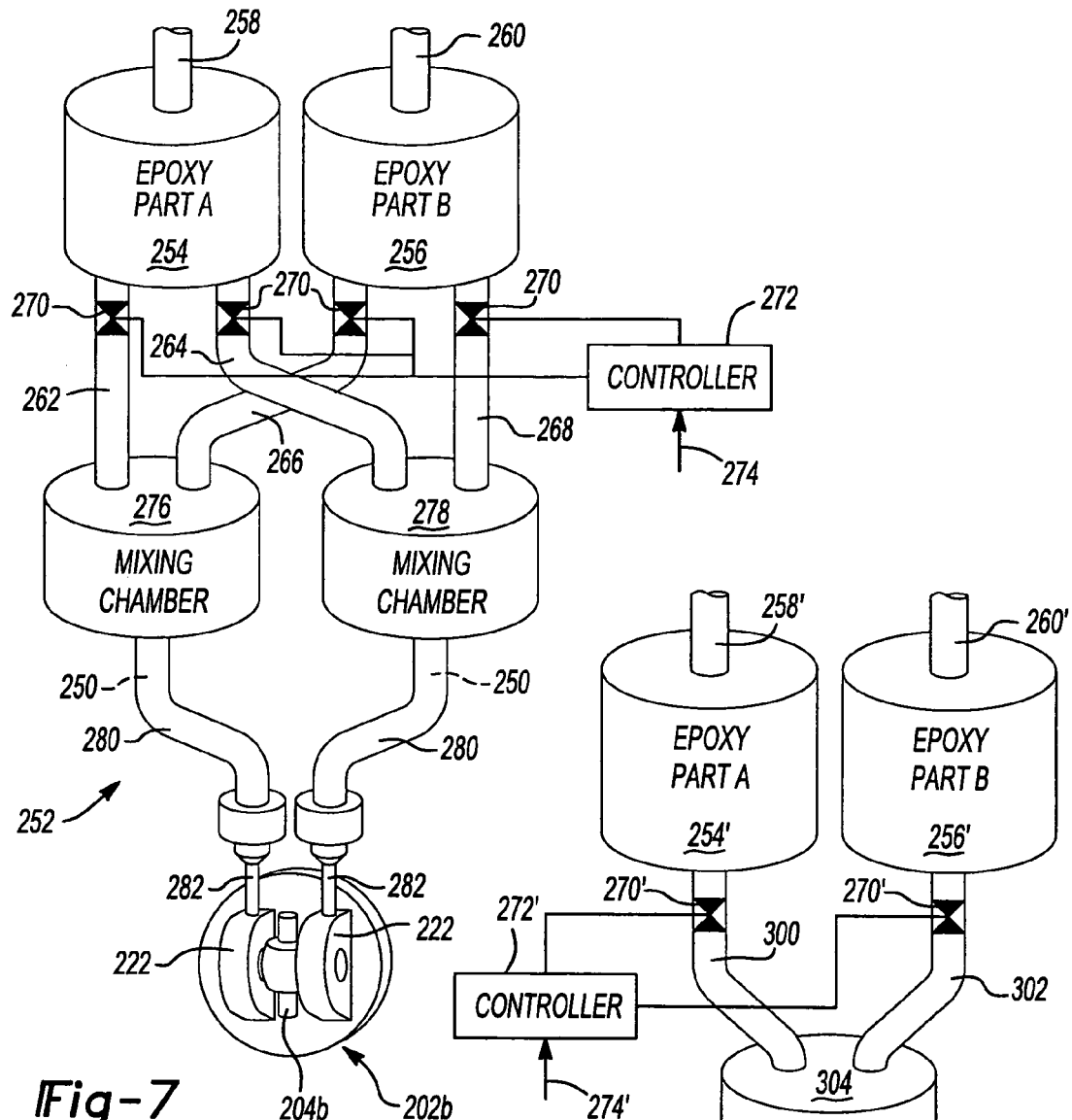
FIG. 7 is a schematic illustration of a device for assembling the propshaft of FIG. 1.

With reference to FIG. 7, an epoxy material 250 may be introduced to the universal joint through the first aperture 224 in each of the arms 222. In the example illustrated, a device 252 for introducing the epoxy material 250 can include a first container 254, which is configured to hold a first epoxy component A, and a second container 256, which is configured to hold a second component epoxy component B.

The first container 254 may include a first outlet 262 and a second outlet 264, and the second container 256 may include a third outlet 266 and a fourth outlet 268. The first outlet 262 and second outlet 264 on the first container 254 each enable the release of the first epoxy component A from the first container 254, while the third outlet 266 and fourth outlet 268 each enable the release of the second epoxy component B from the second container 256. More specifically, a valve 270 may be fluidly coupled to the first outlet 262, second outlet 264, third outlet 266 and fourth outlet 268. The valve 270 may also be in communication with a controller 272. The controller 272 can open the first outlet 262, second outlet 264, third outlet 266 and fourth outlet 268 depending on an input 274 received from an operator (not shown). The first outlet 262 and third outlet 266 are also fluidly coupled to a first mixing chamber 276, while the second outlet 264 and fourth outlet 268 are fluidly coupled to a second mixing chamber 278.

The first mixing chamber 276 and a second mixing chamber 278 are configured to each receive the first epoxy component A and the second epoxy component B. Specifically, the first mixing chamber 276 is fluidly coupled to the first outlet 262 from the first container 254 to receive the first epoxy component A and the third outlet 266 from the second container 256 to receive the second epoxy component B. Similarly, the second mixing chamber 278 is fluidly coupled to the second outlet 264 of the first container 254 to receive the first epoxy component A and fluidly coupled to the fourth outlet 268 of the second container 256 to receive the second epoxy component B. As the first epoxy component A and second epoxy component B each enter into the each of the first mixing chamber 276 and second mixing chamber 278, the first epoxy component A and second epoxy component B undergo a chemical reaction upon contact to form the epoxy 250. The epoxy 250 exits the first mixing chamber 276 and second mixing chamber 278 via a respective outlet 280. Each outlet 280 is fluidly coupled to a respective injection nozzle 282. The injection nozzle 282 is sized mate with the corresponding first aperture 224 formed in the arms 222. Additionally, the injection nozzle 282 can be configured to pressurize the epoxy 250, by including a piston (not shown) within the injection nozzle 282 which can force the epoxy 250 into the joint. Further, the first and second mixing chambers 276, 278 may be adapted to contain a piston (not shown) to force the first epoxy component A and second epoxy component B into the first and second mixing chambers 276, 278.

In order to retain the bearing cup 208 in the respective arm 222, the bearing cup 208 is inserted into the second aperture 226 in the respective arm 222 such that the annular groove 232 of the bearing cup 208 corresponds with the annular groove 228 of the respective arm 222. The clearance between the bearing cup 208 and respective arm 222 may be in the range of 0.002 inches to 0.003 inches. Generally, the bearing cup 208 will be assembled with the bearing element (not specifically shown) and then inserted in the arms 222. Next, the respective spider 204 may be inserted into the bore 230 of the bearing cup 208. Then, the bearing cups 208 and arms 222 may be positioned such that the injector nozzle 282 is aligned with both of the first apertures 224 in the arms 222. Typically, the bearing cup 208 is assembled with the arms 222 manually, however an automated process may be employed. Next, based on the input 274 from the operator (not shown), the controller 272 can release the first epoxy component A and second epoxy component B into the first and second mixing chambers 276, 278. After mixing to form the epoxy 250, the epoxy 250 is injected via the injection nozzle 282 into the first aperture 224 of the arms 222. Specifically, the epoxy 250 is injected into the first aperture 224 at a pre-selected pressure such that the epoxy 250 flows through the passageway defined by the first aperture 224 and into the mold cavity formed by the annular groove 232 of the bearing cup 208 and the annular groove 228 of the arms 222, as best shown in FIG. 5. Due to the density of the epoxy 250, the air in between the annular groove 232 of the bearing cup 208 and annular groove 228 of the respective arm 222 can be displaced, enabling the epoxy 250 to fill the passageway. Generally, pressures will vary based on the clearance between the bearing cup 208 and the respective arms 222, along with the viscosity of epoxy 250 employed, but typically the pressure may be in the range of 500 to 1000 pounds per square inch. After a curing period, generally at or approximately less than 25 seconds, the bearing cup 208 is fixedly coupled to the arms 222.

Figure 8:
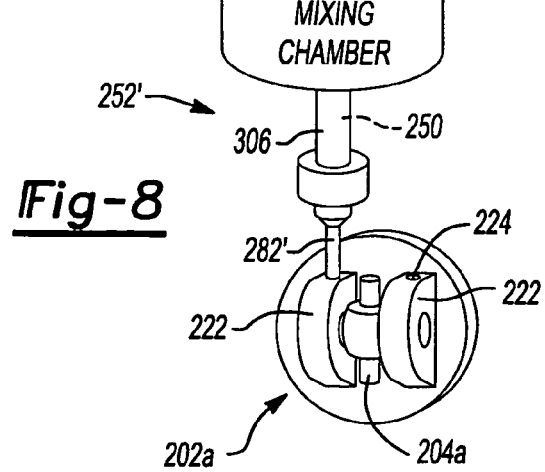
FIG. 8 is a schematic illustration of an alternate device for assembling the propshaft of FIG. 1.

In order to service either the universal joint, an operator (not shown) can mix the required amounts of the first epoxy component A and the second epoxy component B to form the epoxy 250. Then the operator can inject the epoxy 250 with a pressurized gun (not shown) or syringe (not shown) into the desired first aperture 224 formed in the desired arm 222. Alternatively, as shown in FIG. 8, the service provider may have a smaller device 252' which is capable of injecting the epoxy 250 into one of the desired first apertures 224 in the arms 222. Since the device 252 as shown in FIG. 7 is substantially similar to the device 252' shown in FIG. 8, the same reference numerals will be used throughout.

In this alternative embodiment, epoxy component A and epoxy component B are stored in a first container 254' and a second container 256', respectively. Epoxy component A and epoxy component B enter the first and second container 254', 256' through an inlet 258' and an inlet 260', respectively. In addition, the first container 254' may include an outlet 300 which may be fluidly coupled to a valve 270'. Similarly, the second container 256' may include an outlet 302 coupled to a valve 270'. The valves 270' are coupled to a controller 272' which enables the first epoxy component A and second epoxy component B to enter a mixing chamber 304 based on an input 274' from an operator (not shown). The mixing chamber 304 may include an outlet 306 coupled to an injection nozzle 282' for injecting the epoxy 250 into the bearing cup 208 and arm 222 assembly as discussed previously. In service applications, generally the cure time may be in the range of one to five minutes.

Thus, the propshaft assembly 20 of the present invention enables universal joints to be repaired and restored to their original condition through the use of a room temperature adhesive. The use of a room temperature adhesive not only enables universal joints to be restored to their original configuration, but further decreases the time and complexity associated with assembling and repairing of universal joints. In addition, it will be understood that the principles of the present invention may also be applicable to additional components in the driveline 12, such as the yoke assembly 206.

While the invention has been described in the specification and illustrated in the drawings with reference to various embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the foregoing description and the appended claims.

What is claimed is:

1. A method comprising:
   providing a yoke with a pair of arms, each of the arms having a trunnion aperture formed therein;
   installing a trunnion into each trunnion aperture;
   installing a bearing cup such that it is received into one of the trunnion apertures and received onto an associated trunnion;
   injecting an epoxy between the arms and the bearing cups; and
   curing the epoxy to secure the bearing cups to the arms.

2. The method of claim 1, wherein the epoxy is cured at a temperature that is less than about 130° F.

3. The method of claim 2, wherein the epoxy is cured at a temperature that is about 50° F. to about 100° F.

4. The method of claim 1, wherein an epoxy filling aperture is formed in each arm and the epoxy is injected into the epoxy filling aperture.

5. The method of claim 4, wherein the epoxy filling aperture is generally transverse to the trunnion aperture.

6. The method of claim 1, wherein the bearing cup includes at least one recess that is formed into its outer surface and wherein the epoxy at least partially fills the at least one recess.

7. The method of claim 6, wherein the at least one recess includes a groove that extends about the bearing cup.

8. The method of claim 1, wherein the epoxy is selected from a group consisting of a two-part epoxy with a push-out force of at least 2000 pounds.

9. The method of claim 1, wherein the epoxy is a two-part epoxy.

10. The method of claim 9, wherein the two-part epoxy is mixed substantially simultaneously with its injection.

11. A method comprising:
   inserting a bearing cup into a trunnion aperture formed in an arm of yoke;
   injecting an adhesive between the bearing cup and the arm of the yoke; and
   curing the adhesive at a temperature that is less than about 130° F.

12. A method of a claim 11, wherein at least one recess is formed in the bearing cup and the adhesive flows at least partially into the at least one recess when the adhesive is injected between the bearing cup and the arm of the yoke.

13. The method of 12, wherein the at least one recess includes a groove that is formed about the bearing cup.

14. The method of claim 11, further comprising mixing the adhesive prior to injecting it between the bearing cup and the arm of the yoke.

15. The method of claim 11, wherein the adhesive is an epoxy.

* * * * *